United States Patent
Rousseau

(10) Patent No.: US 8,605,260 B2
(45) Date of Patent: Dec. 10, 2013

(54) RANGE FINDER

(75) Inventor: Pascal Rousseau, Viroflay (FR)

(73) Assignee: Thales, Neuilly sur Seine (FR)

( * ) Notice: Subject to any disclaimer, the term of this patent is extended or adjusted under 35 U.S.C. 154(b) by 205 days.

(21) Appl. No.: 13/132,871

(22) PCT Filed: Dec. 3, 2009

(86) PCT No.: PCT/EP2009/066360
§ 371 (c)(1), (2), (4) Date: Jun. 3, 2011

(87) PCT Pub. No.: WO2010/063805
PCT Pub. Date: Jun. 10, 2010

(65) Prior Publication Data
US 2011/0235020 A1    Sep. 29, 2011

(30) Foreign Application Priority Data
Dec. 5, 2008    (FR) .................................. 08 06833

(51) Int. Cl.
*G01C 3/08*    (2006.01)

(52) U.S. Cl.
USPC .................. 356/5.01; 356/4.01; 356/141.1

(58) Field of Classification Search
USPC ............................. 356/5.01, 4.01, 141.1, 3.01
See application file for complete search history.

(56) References Cited

U.S. PATENT DOCUMENTS

| | | | |
|---|---|---|---|
| 4,830,485 A | 5/1989 | Penney et al. | |
| 6,323,941 B1 | 11/2001 | Evans et al. | |
| 6,714,339 B2 * | 3/2004 | Gosselin et al. | 359/291 |
| 6,897,946 B2 * | 5/2005 | Uomori et al. | 356/3.1 |
| 7,329,830 B2 * | 2/2008 | Baudron et al. | 219/121.68 |
| 7,859,651 B2 * | 12/2010 | Gunther et al. | 356/5.01 |
| 7,990,523 B2 * | 8/2011 | Schlierbach et al. | 356/5.01 |
| 8,149,490 B2 * | 4/2012 | Mizukami et al. | 359/225.1 |
| 2002/0196424 A1 * | 12/2002 | Sano et al. | 356/4.01 |
| 2004/0004707 A1 | 1/2004 | DeFlumere | |
| 2004/0021852 A1 | 2/2004 | DeFlumere | |
| 2011/0116072 A1 | 5/2011 | Rousseau | |

FOREIGN PATENT DOCUMENTS

| | | |
|---|---|---|
| FR | 2688324 A1 | 9/1993 |
| FR | 2740558 A1 | 4/1997 |
| FR | 2913269 A1 | 9/2008 |
| FR | 2954610 A1 | 6/2011 |
| GB | 2 252 398 A | 8/1992 |

* cited by examiner

*Primary Examiner* — Isam Alsomiri
*Assistant Examiner* — Samantha K Abraham
(74) *Attorney, Agent, or Firm* — Baker & Hostetler LLP

(57) ABSTRACT

A range finder includes a device for transmitting a laser beam and a device for receiving the laser echoes backscattered by a target, comprising a frontal optical system focusing the echoes on a detection zone which comprises at least one elementary detection zone associated with an individual detector with a large bandwidth, referred to as a temporal detector, and means for transporting the detection zone to the individual detector. An elementary zone is furthermore associated with a low-noise individual detector, referred to as a spatial detector, and the receive device furthermore comprises, connected to the transporting means, a switch suitable for associating said elementary detection zone with the temporal detector and with the spatial detector, alternately or in a static manner.

12 Claims, 1 Drawing Sheet ically modu-
RANGE FINDER

CROSS-REFERENCE TO RELATED APPLICATIONS

This application is a National Stage of International patent application PCT/EP2009/066360, filed on Dec. 3, 2009, which claims priority to foreign French patent application No. FR 0806833, filed on Dec. 5, 2008, the disclosures of which are incorporated by reference in their entirety.

FIELD OF THE INVENTION

The invention relates to the domain of range finding.

BACKGROUND

A range finder enables the measurement of the range separating it from a target. An optical range finder uses the propagation of light as the means of measurement. The range finder is composed of a transmitter and a receiver. It emits light in the direction of the target and detects a fraction of this light returned by the target. The range is obtained on the basis of the round-trip propagation time of the light from the transmitter to the receiver. The transmission is temporally modulated. The transmitted light transports this modulation to the target. The target reflects or backscatters this light. A fraction of this returned light transports the modulation to the receiver of the range finder. This temporal modulation enables the identification of the departure of the pulse and the identification of its return by the receiver. The time elapsed between these two events enables the range between the range finder and the target to be calculated on the basis of the propagation speed of the light in the environments through which it passes.

According to the various situations involved, the design of the range finder seeks to achieve the best compromise. Numerous technical parameters are to be optimized: the transmission wavelength(s) and their spectral widths, the geometry of the transmission (diameter and divergence), the geometry of the reception (pupil diameter and receive field), and the temporal modulation profile. The compromises also take into account the means for aiming the transmission and the reception in the direction of the target, and the disturbances produced by the thermal and mechanical environments. In some cases, the transmission and reception share the same optical pupil.

The typical design of a range finder comprises:
a transmitter device including a transmitter and its beam-shaping optical system,
a receiver device, as shown in FIG. 1, which includes an optical system 10 for collecting and focusing the flow coming from the target and a detector 4. The field of the receiver is limited in the focusing plane by the dimension of the sensitive zone of the detector, referred to as the detection zone, or by an optical system for transporting the light to the detector (via fiber 2, for example). A spectral filtering is incorporated in the path.

The fraction of transmitted light collected by the optical system of the receive device is very weak. The ways of increasing performance are:
either being capable of detecting weaker signals,
or increasing the illuminance of the target.

The solutions currently proposed for detecting a weak flow are derived from one of the following categories, based on:
an increase in the repetition rate of the transmitted pulses which enables the use of post-integration, but whose main constraints are an increase in the size of the laser, in its power consumption and in the measurement duration;
an increase in the surface of the receive pupil, the latter being limited by a size constraint;
a reduction in the noise sources. Detection of weaker signals is possible with the same detection technology. The noise sources are external or internal to the range finder. External noise is the noise whose source is the light (ambient solar illuminance, for example) reaching the detector but which was not transmitted by the transmitter. This noise source may be reduced by reducing the spectral width of the filter to the detriment of its transmission and its performance as a function of temperature. Internal sources are mainly linked to the dimensions of each detector and of the bandwidth required for the detection of the temporal modulation. The dimension of the detection zone determines the receive field. This dimension can be reduced, resulting in a reduction in the receive field with the risk of no longer being able to see the target;
an increase in the illuminance of the target. This increase may be obtained by increasing the power or the energy supplied by the transmitter, but this energy is limited by eye safety constraints, and this energy increase requires a larger transmit device;
a reduction in the divergence of the transmission increases the fraction of the flow intercepted by a target smaller than the illuminance spot level with it. This also occurs when only a part of the target makes a significant contribution. Conversely, however, there is the need to point the transmission of the laser with precision at the target, particularly in the case of small, isolated (for example aerial) target range measurement. The line of sight of the range finder is usually oriented with the aid of a camera enabling the target to be maintained on the line of sight during the tracking of the target. In the case of a low-divergence beam which only covers part of the target, a different problem may arise. The line of sight of the range finder is rarely in the direction of the most contributive part of the target in terms of the range measurement. This zone returns the greatest fraction of the transmission through reflection or backscatter to the reception. This part is not readily identifiable in an image which does not use the illuminance of the target by the range finder transmission. Therefore, in order to avoid a dramatic loss of performance when the line of sight is not exactly at the best location, the lesser evil is to distribute the transmission sufficiently over the target, i.e. to increase the divergence of the beam, to the detriment of the range.

Ultimately, the detection performance is generally obtained to the detriment of the detection range.

Consequently, there still remains a need for a system which simultaneously meets all of the aforementioned requirements, i.e. detection of a weak flow and a long detection range.

SUMMARY OF THE INVENTION

The principle of the invention is based on the possibility imparted to the receive device to have a plurality of selectable operating modes:
a mode referred to as location mode, which enables the detection of the target with a high sensitivity, to the detriment of the range measurement, a different mode, referred to as range measurement mode, which enables the temporal detection, for the range measurement.

Temporal detection needs a higher echo level than location. Temporal detection is disturbed by both the luminous noise of the scene and the noise associated with the bandwidth necessary for the temporal precision and therefore the range precision. The prior location of the target by the first mode facilitates the temporal detection of the target in a smaller field or with a greater illuminance of the target by a lower divergence.

The invention enables the range measurement of a target, notably a small target; it also enables the location of the most effective part of a large target and the range measurement of this part.

More precisely, the subject-matter of the invention is a range finder which includes a device for transmitting a laser beam and a device for receiving the laser echoes backscattered by a target, comprising a frontal optical system focusing the echoes on a detection zone comprising at least one elementary detection zone associated with an individual detector with a large bandwidth, i.e. a photodiode coupled to a transimpedance circuit, referred to as an individual temporal detector, and means for transporting the elementary detection zone to this individual temporal detector. It is mainly characterized in that this elementary zone is furthermore associated with a low noise individual detector, i.e. an integrating photodiode, referred to as an individual spatial detector, and in that the receive device furthermore comprises, connected to the transporting means, means for switching the flow received by this elementary detection zone to the temporal and/or to the spatial detector.

It is therefore possible at any time to choose, for each elementary zone, either the echo location mode, or the range measurement mode, or both.

According to one characteristic of the invention, the transporting means are an optical fiber whose input is located on the elementary detection zone and whose output is connected to the input of the switching means, and it includes, at the output of the switching means, two new optical fibers coupled to the spatial detector and the temporal detector respectively.

These switching means may be means for alternate switching or means for distribution of a fraction of the received flow to the temporal detector and of the additional fraction of the flow to the spatial detector.

The receive device possibly includes a matrix of microlenses placed in the reception zone in such a way as to range this reception zone to the input of the optical fibers in order to improve the coupling of the bundle of optical fibers with the backscattered echoes.

According to one variant of the invention, the transporting means are a micromirror located on the elementary detection zone, and the switch is a control of the orientation of said micromirror in such a way as to send the echoes from the elementary zone to the spatial detector or to the temporal detector.

The photodiode of the temporal detector is, for example, a PIN or APD photodiode.

The laser transmit device is an amplitude-modulated and/or frequency-modulated continuous-transmission device, or a device for transmitting one or more laser pulses.

The subject-matter of the invention is also a method for the range measurement of a target by means of a range finder as described, characterized in that it includes:

a step of locating the target which includes the following sub-steps:
transmission of a laser beam,
detection of the laser echoes backscattered by the target, by means of the spatial detectors,
reiteration of the preceding sub-steps until the target is located,
a step of range measurement of the located target which includes the following sub-steps:
transmission of a laser beam,
detection of the laser echoes backscattered by the target, by means of the temporal detectors.

According to one characteristic of the invention, prior to the transmission of the laser beam of the step of range measurement of the located target, the field of the laser beam is reduced.

Possibly following the location step, it includes a step of orientation of the line of sight of the laser transmit device with the located target, prior to the range measurement step.

According to one characteristic of the invention, prior to the sub-step of detection of the step of range measurement of the located target, it includes a step of switching from spatial detectors to temporal detectors.

BRIEF DESCRIPTION OF THE DRAWINGS

Other characteristics and advantages of the invention will become apparent from a reading of the detailed description which follows, given by way of a non-limiting example, with reference to the attached drawings, in which.

DETAILED DESCRIPTION

The same elements are identified by the same references in both figures.

The range finder according to the invention enables the precise location of the direction of transmission of the range finder. It also enables the location of the most effective part of the target and the range measurement of this part.

Figure 1:
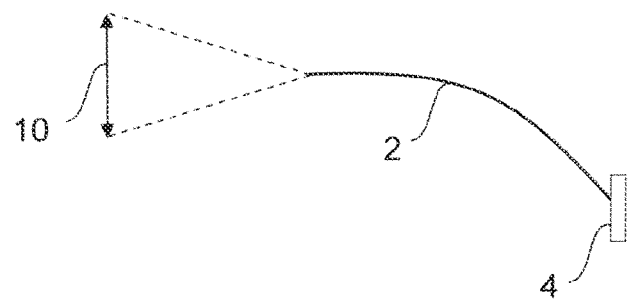
FIG. 1, already described, shows schematically in cross-section a device for detecting a range finder according to the prior art.
Figure 2:
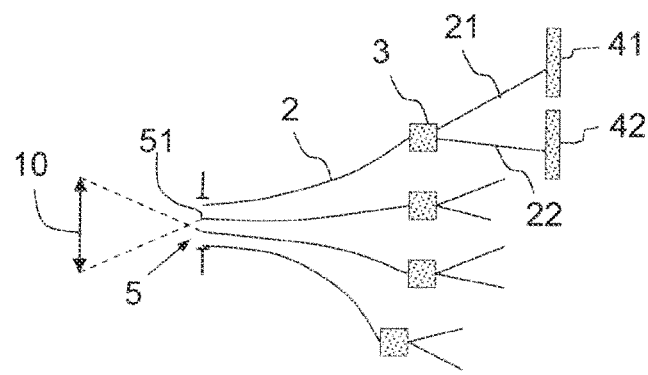
FIG. 2 shows schematically in cross-section an example of a range finder according to the invention.

It includes a device for transmitting a laser beam and a device for detecting emissions backscattered by the target. This detection device, an example of which is shown in FIG. 2, includes a frontal optical system 10 which focuses the laser echoes backscattered by the target onto a detection zone 5. This detection zone is divided up into elementary detection zones 51. According to the invention, one or more (or even all) of these elementary zones 51 are associated via a switch 3 with a temporal detector 42 and a spatial detector 41. To enable the same elementary zone 51 to be in location mode or in range measurement mode as required, a transporting of the detectors is carried out.

The transporting of the detection zone to the individual detectors may be carried out by means of micromirrors. These micromirrors switch each elementary zone 51 to its dedicated detectors 41, 42. Micromirrors individually suitable for being controlled (possibly assembled in the form of a matrix) are disposed in the detection zone 5 to enable them to be oriented as required in such a way as to send the light from each elementary zone 51 to either a range measurement detection or a location detection.

The transporting of the detection zone to the individual detectors may also be carried out by optical fibers 2, the input of which is located on the detection zone 5. Each fiber 2 is coupled to a spatial detector 41 or to a temporal detector 42. The coupling of each fiber to the detectors may be static or, in certain cases, a switch 3 switches mainly the flow transported by the fiber to the spatial detector or the temporal detector as required. The switch may also be fibred: the fiber 2 is then divided into two fibers 21, 22 which are coupled to a spatial detector 41 and to a temporal detector 42 respectively.

It can be envisaged to position a matrix of microlenses at the focal point of the frontal optical system 10, by the bundle of fibers, to maximize the flow of each elementary zone 51 coupled to each fiber: one microlens is therefore associated with one optical fiber 2.

Despite a slight limitation of performance, for some or for each elementary zone, the alternate switching between the two detection modes can be replaced by a static distribution. The latter consists, for example, in switching a fixed fraction of the flow to the location and the additional fraction to the ranging detection. This is implemented by means of a semi-reflective strip or by an optical coupler. The value of this fixed fraction may differ according to the position of the elementary zone 51 in the detection zone 5.

Finally, the flow received by the elementary detection zone 51 may be:
  switched alternately to the spatial detector or the temporal detector by a switch, or,
  switched by a distributor simultaneously to the spatial detector which receives a fraction thereof, and to the temporal detector which receives the additional fraction.

Optical fibers have been chosen below as transporting means, with reference to the particular case of alternate switching, but the example applies equally well to other transporting means and to static distribution.

According to the invention, there is, at the other end of the optical fiber of at least one elementary zone, the possibility of choosing either a very low noise detection for the spatial location of the target, or a large-bandwidth temporal detection enabling measurement of the range of the target. For this purpose, the fiber 2 is connected to a switch 3 (also referred to as a controllable switch) to a fiber 22 coupled to a photodiode optimized for range measurement 42 and/or to a different fiber 21 coupled to a photodiode optimized for location 41.

A photodiode optimized for location, also referred to as a spatial detector, is typically a photodiode assembled in an integrating circuit. The assembly is a very low noise assembly. During the integration period, the charges created are stored then, following the integration period, the read circuit converts these charges into a signal proportional to the number of charges collected. The duration of the integration is adapted according to the range domain in which the target may be located. The detection of a very weak signal is possible, such as a signal of around ten photons.

For the range measurement, the detector must enable the temporal identification of the arrival of the echo. The temporal detector also converts the flow of photons into a current. This current is read continuously via a transimpedance circuit. A photodiode, the assembly of which is optimized for range measurement, also referred to as a temporal detector, is typically a PIN or APD photodiode, a photodiode with a large bandwidth. Its performance is limited by the noise inherent in the detector and the associated transimpedance circuit. The resolution of the temporal modulation enables a precise measurement of the range. An avalanche photodiode enables an improvement in the signal-to-noise ratio. From several hundred to thousands of photons are necessary for a signal-to-noise ratio which is sufficient to limit the probability of a false alarm.

The level of the signal detectable by the temporal detector is much higher than that which is detectable by the spatial detector. The ratio may be greater than 100.

It is therefore possible at any time to choose, for each elementary zone, either the echo location mode, or the range measurement mode. Thus, in the case of small-target ranging, a single fiber, for example, is allocated to the range measurement while the others control the centering on the target. The choice of the elementary zone associated with the range measurement may be modified from one laser transmission to the other. Moreover, for larger targets, it is possible to allocate a plurality of elementary zones to the range measurement in order to increase the sensitivity.

The invention also enables precise location of the most contributive parts of the target in order to achieve range measurement which is still effective at a greater range. Thanks to this precise location with the same level of energy per pulse, a smaller transmission divergence is usable. Thus, the illuminance of the most important parts of the target can be increased thanks to the divergence reduction. A precise orientation of the direction of transmission is possible on the basis of the location information.

This arrangement also eliminates the relative drift of the laser direction of transmission in relation to the receive field. The information relating to the alignment of the direction of transmission with the system's pointing and tracking means is available at all times.

The operation of this range finder will now be described.

The transmission of the laser beam may be an amplitude-modulated and/or frequency-modulated continuous transmission or an isolated pulse or a train of pulses.

For the transmission of the location step, all of the elementary zones 51 are associated with their very low noise detector 41 (spatial detector). An image of the detection zone 5 is formed. The elementary zone having the most echo is located by comparing the energy levels received by the low noise detectors; this comparison is, for example, carried out by a calculating unit. The measurement of the deviation between this zone and the direction of transmission may be supplied.

This information is transmitted to the optronic system, in which the range finder is integrated, to enable it to reorientate the direction of transmission of the range finder for the following transmission. At system level, the control of the line of sight is fine-tuned. The field portion in which the range measurement is to be carried out is chosen: the detection for range measurement on the corresponding elementary zone is selected. The other elementary zones remain coupled to their detector for location 41 in order to continue to perform their spatial observation function and enable the system to correct the orientation of the line of sight of the range finder for the following transmissions.

The detection of the step of range measurement of the located target will enable detection of the arrival of the echo and therefore measurement of the range of the target. The location detections by the other elementary zones will enable the direction of the target to be tracked.

The invention therefore enables range measurement in a part of the range finder field, whereas the remainder of the field is in observation mode in order to be able to supply a correction of the orientation of the line of sight for the following transmission.

An example embodiment of a range finder according to the invention will now be described in more detail.

The description is provided in the context of a range finder transmitting laser pulses with a width in the order of 10 ns and a wavelength, for example, equal to approx. 1.5 μm. The detection zone is divided into a plurality of elementary zones, for example 4×4 elementary zones.

At the focal point of the collimation frontal optical system, i.e. in the detection zone, is placed a small matrix of lenses, for example 4×4, of sub-fields of around 100 μrad in which the photons are collected. The photons are then oriented towards the detectors by 4×4 optical fibers.

A detection optimized for range measurement by means, for example, of an APD photodiode, and a detection optimized for location, for example an integrating PIN photodiode, are associated with each elementary zone.

In order to avoid a limitation by the day noise, the field of view of each location detector is weak, typically less than 100 μrad, and the spectral width is weak, typically less than 20 nm. The integration time is not greater than 500 μs: It is adapted according to the required range search depth, which is in the order of 80 km. The field of view of each range measurement detector is the same as that of the location detectors.

The direction of transmission of the laser is known or already calibrated by means of a range measurement sequence on a target of sufficiently uniform opportunity (a cultivated field, for example).

Initially for the laser transmission of the location step, all of the elementary zones are in location mode. The most effective position is calculated through detection and relative weighting of the elementary zones. A deviation measurement is supplied to the system integrating this range finder in order to re-center on the target the direction of transmission and also the detectors associated with the central zones, referred to as the central detectors.

For the laser transmission of the step of range measurement of the located target, the detector(s) pointed towards the most effective detection, i.e. towards the direction of transmission of the range finder (in this case the central detectors), are controlled in temporal detection mode, whereas the other detectors (in this case the peripheral detectors) remain in location mode. The range measurement is obtained. The association of the data of the central detectors in range measurement mode and the peripheral detectors in location mode also enables a new deviation measurement.

The quantities of photons to be received for range measurement detection or for location are so different that the tracking may be maintained even if the level is insufficient for range measurement.

The invention claimed is:

1. A range finder including a device for transmitting a laser beam and a device for receiving laser echoes backscattered by a target, comprising:
    a frontal optical system focusing the laser echoes on a detection zone divided up into a plurality of elementary detection zones, at least one of which is associated with a photodiode coupled to a transimpedance circuit with a large bandwidth coupled to measure a range of the target, referred to as an individual temporal detector, and
    a means for transporting an elementary detection zone to the individual temporal detector, wherein the same elementary detection zone is furthermore associated with a very low noise integrating photodiode, referred to as an individual spatial detector configured to locate a most effective part of the target, and the device for receiving includes, connected to the means for transporting, a means for switching a flow of photons received by the elementary detection zone to the temporal detector and/or to the spatial detector, wherein a level of the laser echoes detected by the individual temporal detector is higher than a level of the laser echoes detected by the individual spatial detector.

2. The range finder as claimed in claim 1, wherein the means for switching are alternate switching means.

3. The range finder as claimed in claim 2, wherein the means for transporting are a micromirror located in the elementary detection zone, and the means for switching is a control of an orientation of said micromirror in such a way as to transfer the laser echoes from the elementary detection zone to the spatial detector or to the temporal detector.

4. The range finder as claimed in claim 1, wherein the means for switching are means for distributing a fraction of the flow received by the elementary detection zone to the temporal detector and an additional fraction of the flow to the spatial detector.

5. The range finder as claimed in claim 1 wherein the means for transporting is an optical fiber whose input is located on the elementary detection zone and whose output is connected to an input of the means for switching, and further comprising, at an output of the means for switching, two additional optical fibers each connected to the spatial detector and the temporal detector, respectively.

6. The range finder as claimed in claim 5, wherein the device for receiving includes a matrix of microlenses placed in a reception zone in such a way as to range this reception zone to the input of the optical fibers in order to improve the coupling of the bundle of optical fibers with the backscattered laser echoes.

7. The range finder as claimed in claim 1, wherein the photodiode of the individual temporal detector is a PIN or an Avalanche Photo-Diode (APD) photodiode.

8. The range finder as claimed in claim 1, wherein the device for transmitting the laser beam is an amplitude-modulated and/or frequency-modulated continuous-transmission device, or a device for transmitting one or more laser pulses.

9. A method for range measurement of a target by means of the range finder of claim 1, comprising:
    a step of locating the target which includes:
        a transmission of a laser beam,
        a detection of the laser echoes backscattered by the target, by means of the individual spatial detector, and reiteration of the steps of said transmission and said detection until the target is located,
    and
    a step of range measurement of the located target which includes:
        a transmission of another laser beam, and
        a detection of the laser echoes backscattered by the target, by means of the individual temporal detectors.

10. The range measurement method as claimed in claim 9, wherein, prior to the transmission of the laser beam of the step of range measurement of the located target, a field of the laser beam is reduced to a field of the another laser beam.

11. The range measurement method as claimed in claim 9, further comprising, following the location step, a step of orientation of a line of sight of the device for transmitting the laser beam with the located target, prior to the range measurement step.

12. The method as claimed in claim 9, further comprising, prior to the detection of the step of range measurement of the located target, a step of switching from the individual spatial detector to the individual temporal detector.

* * * * *